US011196980B2

(12) United States Patent
Vogelzang (10) Patent No.: US 11,196,980 B2
(45) Date of Patent: Dec. 7, 2021

(54) NON-INTRUSIVE 360 VIEW WITHOUT CAMERA AT THE VIEWPOINT

(71) Applicant: DISCOVERY COMMUNICATIONS, LLC, Silver Spring, MD (US)

(72) Inventor: Leon Vogelzang, Silver Spring, MD (US)

(73) Assignee: DISCOVERY COMMUNICATIONS, LLC, Silver Spring, MD (US)

( * ) Notice: Subject to any disclaimer, the term of this patent is extended or adjusted under 35 U.S.C. 154(b) by 0 days.

(21) Appl. No.: 17/087,848

(22) Filed: Nov. 3, 2020

(65) Prior Publication Data

US 2021/0176448 A1 Jun. 10, 2021

Related U.S. Application Data

(63) Continuation of application No. PCT/US2019/064147, filed on Dec. 3, 2019.

(51) Int. Cl.
*H04N 13/243* (2018.01)
*H04N 13/156* (2018.01)
*H04N 13/282* (2018.01)

(52) U.S. Cl.
CPC ......... *H04N 13/243* (2018.05); *H04N 13/156* (2018.05); *H04N 13/282* (2018.05)

(58) Field of Classification Search
CPC ... H04N 13/243; H04N 13/282; H04N 13/156
USPC .......................................................... 348/48
See application file for complete search history.

(56) References Cited

U.S. PATENT DOCUMENTS

| 5,850,352 | A | 12/1998 | Moezzi | |
|---|---|---|---|---|
| 10,277,813 | B1 | 4/2019 | Thomas | |
| 2005/0062869 | A1* | 3/2005 | Zimmermann | .... H04N 5/23206 348/335 |
| 2007/0279494 | A1 | 12/2007 | Aman | |
| 2011/0234763 | A1 | 9/2011 | Hwang | |
| 2016/0173757 | A1* | 6/2016 | Choi | .................. H04N 5/23296 348/262 |
| 2018/0232894 | A1 | 8/2018 | Kim | |
| 2019/0174108 | A1 | 6/2019 | Yano | |

FOREIGN PATENT DOCUMENTS

| EP | 2 150 057 A2 | 2/2010 |
|---|---|---|
| EP | 3 557 559 A1 | 10/2019 |
| WO | 2017/204175 A1 | 11/2017 |

OTHER PUBLICATIONS

PCT International Search Report and Written Opinion of PCT/US19/64147, filed Dec. 3, 2019.

* cited by examiner

*Primary Examiner* — Susan E. Hodges
(74) *Attorney, Agent, or Firm* — J.A. Lindeman & Co. PLLC (57) ABSTRACT

The invention includes systems and methods to provide a non-intrusive 360 view without a camera at the viewpoint. The invention processes video feeds from an array of cameras to track an object in the video feeds and generates an immersive media from the video feeds. The system identifies a primary object and tracks the primary object with an array of mounted sets of at least two cameras. Each of the sets including a camera directed at the object and another camera directed at a background of the object. The system then stitches the video feeds to generate the immersive media.

19 Claims, 6 Drawing Sheets

NON-INTRUSIVE 360 VIEW WITHOUT CAMERA AT THE VIEWPOINT

TECHNICAL FIELD

The invention relates to a video capture system and more specifically to systems and methods to capture an event using surrounding cameras for generation of immersive media without interfering with participants during the event.

BACKGROUND

Media providers are continually searching for ways to provide consumers with newer and better ways to experience events. Advances in capture capabilities and media playback methods, such as by providing immersion into the action of an event is one way to provide a new viewpoint for consumers to experience.

Generation of new content for novel media formats which place viewers in the thick of play is important for media providers in order to continue to provide value to consumers. Consumers of this content are interested in the viewpoints on the arena of play and in seeing what players may see while making decisions in-game. However, in order to provide this type of content, either cameras are placed on competitors which may inhibit or interfere with play, or a system of cables/wires need to be placed over the top of the arena of play which provides a close to, but not fully immersive viewpoint of the action.

However, media capture of immersive action at large-scale and/or chaotic events is difficult because of the intrusive nature of capture, e.g., video/audio recording devices, and/or tracking equipment, e.g., weight, size, and transporting method of the equipment. Immersive capture of these events, e.g., sporting events like basketball, football, soccer matches etc., is difficult without having a camera or tracking devices worn by the competitors. Other methods of immersive capture may include drones, cable suspended cameras, e.g., Skycam, etc. which, although non-intrusive, are not as immersive. Thus, capture of immersive viewpoints of a competition may hinder play due to discomfort and/or intrusiveness of participants carrying capture and/or tracking equipment. In sports, e.g., Indy car racing, where a car or other hefty equipment is used, carrying of capture and/or tracking equipment does not influence play, however, in sports with competitors that directly carry padding or other safety equipment or nothing at all, adding capture and/or tracking equipment for competitors to carry inhibits or influences play. Further, audio/video feeds captured from competitor viewpoints is often unwatchable due to the instability and/or frenzied nature of action during the event.

SUMMARY

The invention provides a solution to this issue by providing systems and methods to capture and process video for playback of immersive media without interfering with participants during an event by providing real-time recording from an array of cameras external to the participation area. The array of cameras is configured to capture both a focused object of the event, e.g., soccer ball, football, basketball, rugby, etc., as well as background events in real-time. The systems receive and process captured video media for storage and playback in a stitched, immersive media format augmented or virtual reality 3D and/or 2D media formats, which include 360- and 180-degree views respectively.

Although, the invention refers to events such as sporting events where action is frenzied. The same solution could be provided for non-competitive, non-sporting events such as concerts, speeches, parades, conventions, etc. where consumers may want to playback the event from different perspectives without having recording devices among the participants. Thus, any references to "arenas," "fields of play," "competitors," etc. are applicable to participants of non-competitive events as well.

The invention provides a technical solution to the technical problems of prior systems. The systems and methods of the invention capture an event without placing cameras within the field of play to overcome the shortcomings of current immersive viewpoint recording methods. In one example embodiment of the invention, an array of video capture cameras surrounds the arena or field of play. By relying on only surrounding cameras, competitors are not distracted or hindered by carrying camera equipment for a similar in-the-action, i.e., immersive, viewpoint of the competition. The array of cameras captures foreground and background information to be stitched together for a comprehensive, real-time capture of the competition.

In one example embodiment of the invention, the array of cameras includes, separate sets of at least two cameras, surrounding the arena, evenly spaced to record real-time video of every angle of the arena with field-of-vision camera coverage of the full arena. Each set of cameras is spaced apart from the next set for 360-degree coverage of the arena, and the field-of-vision of the cameras overlaps to provide better coverage for the stitching of the disparate video feeds.

In one example embodiment of the invention, the set of cameras is controlled by a system, e.g., computer system, tracking a primary object in the arena, e.g., the football, basketball, baseball, soccer ball, or other primary object(s) of play such as participants. The array of cameras may include a greater than needed number of cameras for full coverage of the arena. The system is provided with at least one of the size and shape of the arena, camera mounting information, and locations of the cameras. The video feeds from the array of cameras are stitched together based on the known locations of each of the cameras surrounding the arena of play, and distance from the primary object(s).

In one example embodiment of the invention, the server employs one camera to follow an object in the foreground, such as a soccer ball. The server directs another camera to focus on a position directly behind the soccer ball. In other words, to generate these video feeds, the system tasks one camera of the set of cameras (Camera1) to track/follow a foreground object such as a primary object(s), and tasks another camera of the set (Camera2) to focus on the background of the primary object(s).

In order to determine the background of the primary object(s), a position determination of the primary object(s) in the arena is made through triangulation from mount/camera locations of the array, and the primary object(s) positional distance from Camera2 to determine a background focus of the camera. The two different video feeds of Camera1 and Camera2 from the same mount, provide images which detail the primary object(s), as well as, any action in the background from every surrounding direction. Thus, providing enough visual data for the key perspective of a competitor with the ball on the field of play. In other words, the multiple focuses from the same location (Camera1 and Camera2) combined with the 360-degree views of the same object(s) (views from the surrounding mounts), provides the images for stitching together an immersive 360 view media. Due to this system, users may see the event from at least one key perspective which may be used by players, coaches, referees, or consumers to determine what a competitor could see during the action, and why they may have decided to act a certain way.

Thus, to follow the primary object(s) and their background, actuating mounts to affix each set of cameras are configured to rotate and adjust directionality of each camera to track the primary object(s). These mounts may include any camera stabilizing device such as a tripod, monopod, or other steadying device with actuating capabilities.

In one example embodiment of the invention, the system receives video captured from each camera, analyzes the video, and uses the captured video to track and/or predict movement of the primary object(s). Based on this tracking and/or predicting, the system determines an adjustment of the positioning of each camera to follow the primary object(s) by actuating each mount. As the real-time video is captured, the system also processes the received video for stitching.

In one example embodiment of the invention, the computer system applies video processing techniques to stitch together video input captured by an array of cameras. These techniques may include one or more of horizon determinations, composite graphing, and exposure balancing. The stitching results in a 2-dimensional (2D) or 3-dimensional (3D) virtual reality (VR) and/or augmented reality (AR) media from which, different location/person/object viewpoints may be selected for playback of a point-of-view during an event, e.g., during a competition.

A system of the invention provides for capturing of video from an array of cameras to generate an immersive media for playback. The system including an array of mounts surrounding a field of an event, each of the mounts comprising an actuating mechanism. The array of cameras is attached to the mounts in sets of at least two cameras to each mount. Each of the sets of the at least two cameras including a first camera of the at least two cameras directed at a primary object of the event, and a second camera of the at least two cameras directed at a background of the primary object. The system further including a computing server to actuate the mounts to follow the primary object through the field of the event, and to receive and process the video from the array of cameras to generate the immersive media.

A system of the invention can include the computing server receiving a viewpoint selection of the immersive media and presents the immersive media from the viewpoint for playback. A system of the invention can include the computing server receiving a selection of a viewpoint in the immersive media, and the playback is initiated from the viewpoint. A system of the invention can include the computing server tracking and determining a location of the primary object in the field to determine a focus of the second camera on the background of the primary object. A system of the invention can include the focus of the second camera being at a determined distance beyond the location of the primary object from the second camera. A system of the invention can include the computing server indexing the video from each of the array of cameras. A system of the invention can include the immersive media being a 360-degree virtual reality media.

A computer system of the invention for capturing video from an array of cameras to generate an immersive media for playback. The computer system including a processor to control an actuating mechanism of each mount of an array of mounts surrounding a field of an event to follow a primary object through the field of the event, and to receive and process the video from the array of cameras attached to the mounts to generate the immersive media. The array of cameras is attached to the mounts in sets of at least two cameras to each mount. Each of the sets of the at least two cameras including a first camera of the at least two cameras directed at a primary object of the event, and a second camera of the at least two cameras directed at a background of the primary object.

A computer system of the invention can include the computing server receiving a viewpoint selection of the immersive media and presents the immersive media from the viewpoint for playback. A computer system of the invention can include the processor tracking and determining a location of the primary object in the field to determine a focus of the second camera on the background of the primary object. A computer system of the invention can include the focus of the second camera being at a determined distance beyond the location of the primary object from the second camera. A computer system of the invention can include the computing server indexing the video from each of the array of cameras. A computer system of the invention can include the immersive media being a 360-degree virtual reality media.

A computer-implemented method of the invention for capturing video from an array of cameras to generate an immersive media for playback. The method including receiving video feeds from the array of cameras. The method including analyzing the video feeds determine a primary object in the video feeds. The method including controlling an actuating mechanism of each mount of an array of mounts to follow the primary object. The array of cameras is attached to the array of mounts in sets of at least two cameras to each mount. Each of the sets comprises a first camera of the at least two cameras directed at the primary object of the event and a second camera of the at least two cameras directed at a background of the primary object. The method including generating the immersive media from the video feeds through by stitching the video feeds together.

A computer-implemented method of the invention can include receiving a viewpoint selection of the immersive media; and presenting the immersive media from the viewpoint during playback. A computer-implemented method of the invention can include the processor tracks and determines a location of the primary object in the field to determine a focus of the second camera on the background of the primary object. A computer system of the invention can include the focus of the second camera is at a determined distance beyond the location of the primary object from the second camera. A computer system of the invention can include indexing the video feeds from each of the array of cameras into the immersive media. A computer system of the invention can include the immersive media is a 360-degree virtual reality media.

DETAILED DESCRIPTION

Figure 1:
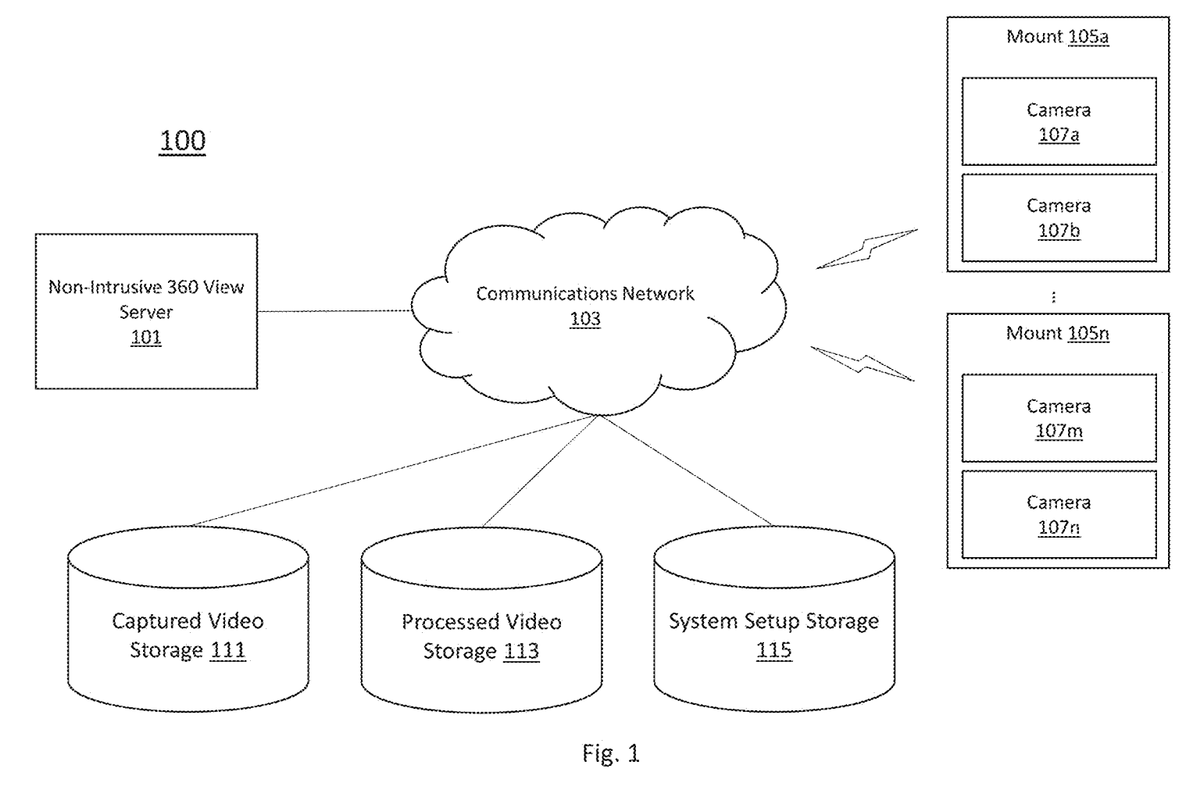
FIG. 1 illustrates a non-intrusive 360 view system in accordance with the invention.

FIG. 1 illustrates a non-intrusive 360 view system 100 that includes a non-intrusive 360 view server 101, network 103, mounts 105a-n, and cameras 107a-n, according to one embodiment of the invention. System 100 may capture, process, and distribute immersive media for playback, by using a non-intrusive 360 view server 101 which communicates with both the mounts 105 and cameras 107 either over a communication network, e.g., LAN, Cable, WLAN, or other wired or wireless network, or through a direct communication connection. The server 101 may include a fully modular architecture that includes one or more distributed or centralized computing devices, e.g., servers, workstations, devices with processors and memory, processors, memory, etc. to enable a media content provider (e.g., editors, media content managers, event coordinators, and others) to deploy the system 100 in an event area. The server 101 functions include capturing video of an event through an array of cameras surrounding the arena, processing of captured video, and storage of processed video for playback. The architecture of the non-intrusive 360 view system 100 supports compact to large-scale deployment of the system 100 and ensures that storage and processing capabilities are robust and suitable for content capture, processing, and storage operations. In other exemplary embodiments, video feeds from other cameras, not part of the system, e.g., standard event cameras, skycam, personal devices of users, may also be included in the generation of the immersive media to provide higher quality immersive media.

An increasing need exists for different viewpoint playback of sporting events to generate VR/AR media. The system 100 provides a scalable array of mounted cameras surrounding an arena of play to limit intrusiveness of media capture devices during sporting competitions. The system 100 tracks the key action of the event in real-time and processes the captured video for generating immersive VR/AR media. As shown in FIG. 1, non-intrusive 360 view system 100 of the invention includes a non-intrusive 360 view server 101 which may control mounts and cameras surrounding an arena to follow a primary object(s) and cover a 360 view of the arena. The server 101 receives video feeds from the cameras which focus on the object(s) as the foreground, as well as, video focusing on the background of the object(s). The array of cameras including mounted sets of cameras surrounding the arena. A set of at least two cameras, are mounted at a number of positions surrounding the arena to include full 360-degree coverage of the arena. Each set captures the foreground and background subjects with separate camera feeds. For example, each set of cameras tracks a soccer ball during a soccer match, a first camera focusing on the ball as the foreground object and a second camera focusing at a determined distance beyond the ball as the background.

Figure 2:
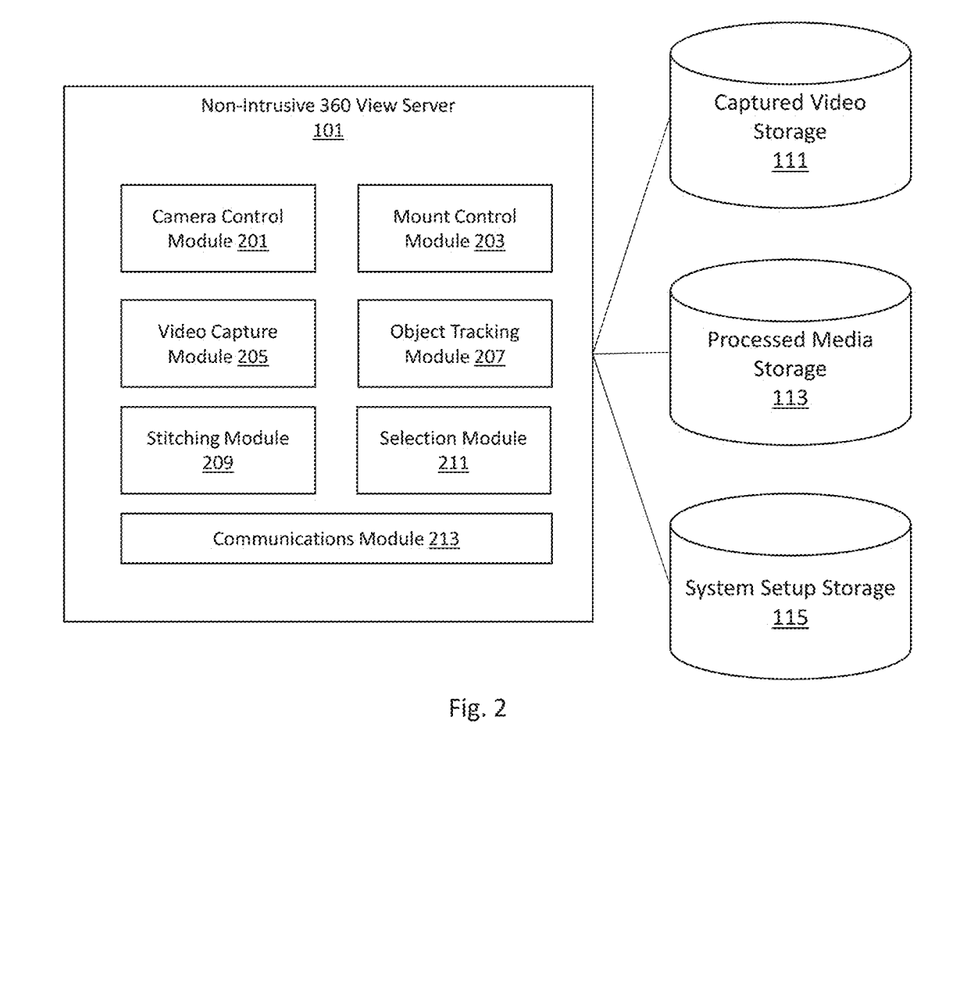
FIG. 2 shows a block diagram of components of a non-intrusive 360 view server in accordance with the invention.
Figure 3:
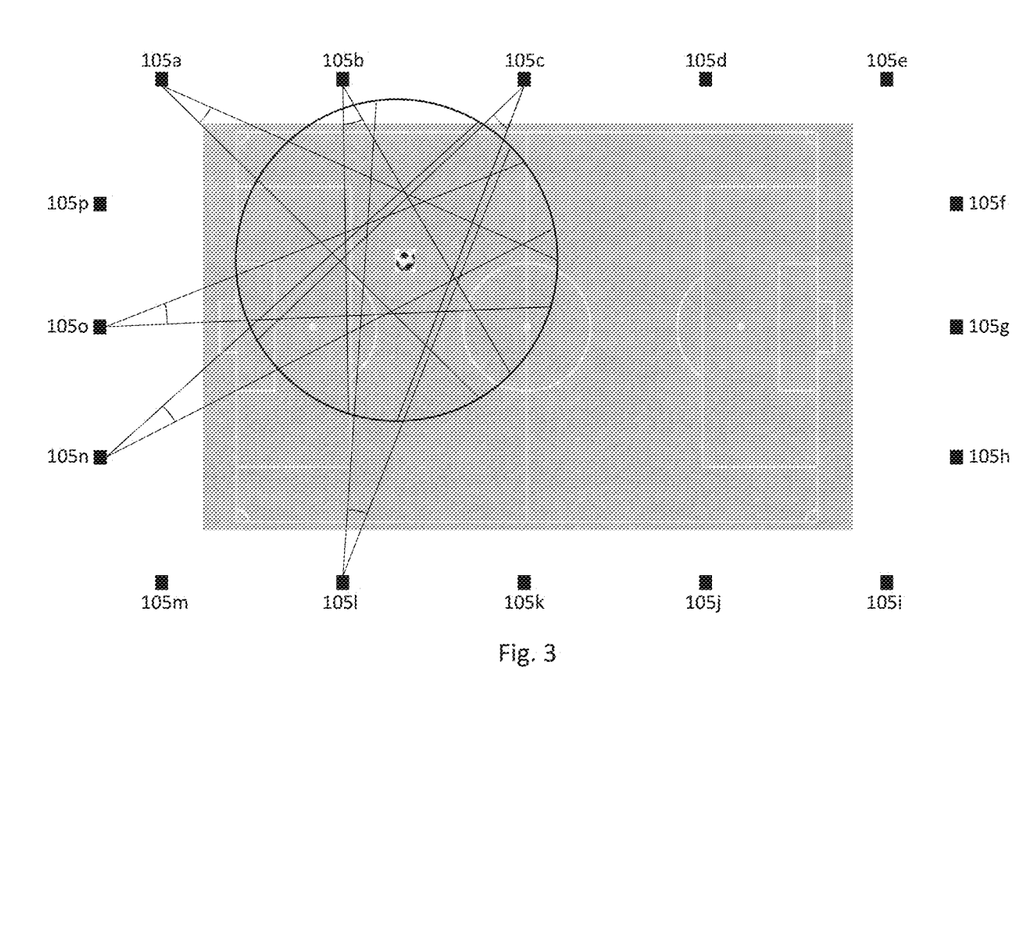
FIG. 3 illustrates a field-of-vision of an array of cameras surrounding an arena of competition in accordance with the invention.
Figure 4:
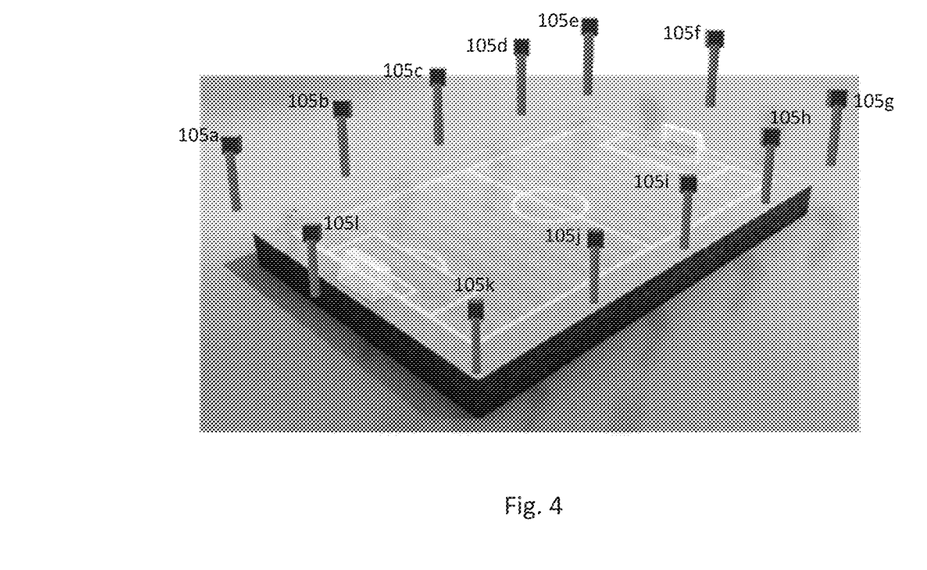
FIG. 4 illustrates an array of mounts for an array of cameras surrounding an arena of competition in accordance with the invention.
Figure 6:
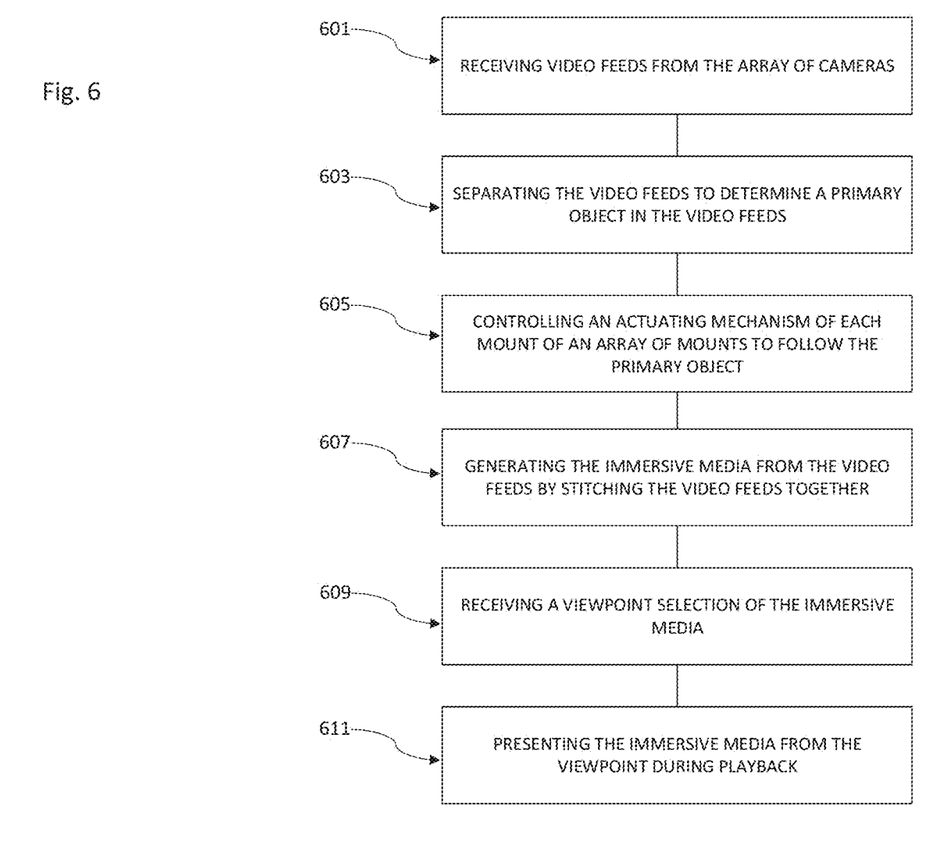
FIG. 6 shows a flow chart for the method of use of the non-intrusive 360 view system in accordance with the invention.

The FIGS. show an exemplary system of the invention for capture and process of captured video for generating immersive media. For example, FIG. 1 shows a system 100 in accordance with the invention that captures and processes video for generation of immersive media. FIG. 2 provides a detailed breakdown of components included in the non-intrusive 360 view server 101. FIGS. 3 and 4 illustrate the camera array surrounding an arena, and FIG. 6 shows an exemplary embodiment of a mount for the array of cameras in FIGS. 3 and 4.

The system 100 includes the non-intrusive 360 view server 101 that may be connected (wired or wirelessly) to a communications network 103, the communications network 103 may further be configured to communicate with mounts 105a-n, cameras 107a-n, and storage devices including at least captured video storage 111, processed video storage 113, and system setup storage 115. The communications network 103 may include any number of LAN, WLAN, Wi-Fi, cellular networks (e.g., 4G LTE and 5G networks), closed circuit networks, etc. In the shown exemplary embodiment, the mounts 105a-n and cameras 107a-n communicate wirelessly to the communications network 103. The storage devices 111-115 may include scalable storage devices, databases, on-board camera memory, one or more server memory/storage, etc. as well as cloud storage devices from which the content in the storage devices 111-115 may be retrieved and/or stored. The mounts 105a-n and cameras 107a-n may be directed by the server 101 via the communications network 103 to capture an object(s) of interest during the competition/event.

The mounts 105a-n may include at least two cameras 107a-n attached to each mount 105a-n. Each mount 105a may include a first camera 107a tasked to focus on a primary object, e.g., soccer ball, football, etc., and a second camera 107b tasked to focus on a background of the primary object, e.g., 10-30 yards (based on the shape and size of the arena), beyond the primary object from the camera/mount position. The mount 105a may include attachment portions for the cameras 107a and b to be affixed. Further, the mount 105a may include adjustment mechanisms connected to the attachment portions, such as rotating mechanisms to follow action along a horizon or adjust viewing angle, axial mechanisms to raise and lower the cameras, and/or levelling mechanisms to align the cameras to the horizon. These mount adjustment mechanisms may be controllable by server 101 to track object(s) in the arena by the affixed cameras 107a and b. Thus, each mount's dimensions and adjustment mechanism information may be stored in and retrieved from the system setup storage 115. The adjustment mechanism information may include range of movement of each adjustment mechanism for each mount, rate of movement, and/or smoothness. The field of vision of the mounted camera array maybe known, and objects maybe tracked from one set of mounted cameras to the next. For example, should one camera video feed be unable to continue to track the primary object in its field-of-vision, the next closest viewing angle, may be determined to pass the object onto another camera of another mount. Thus, as the camera feed tracks an object and meets the furthest viewing angle of the camera, including furthest rotation of the adjustment mechanism, then the next closest camera feed with a view of the object is determined to adjust/rotate to a viewing angle which continues to track the primary object.

The cameras 107a-n may include ultra-high definition (UHD) cameras recording/providing feeds at 4K or higher quality. The cameras 107a-n may also include a variety of cameras with a variety of viewing angles. Thus, even if cameras 107a-n have different viewing angle ranges, the viewing angles are configured to fully capture a 360-degree view of the primary object. Further, the number of cameras 107a-n surrounding the arena should cover the entire field of play. The cameras 107a-n may also be optically zoomed in on the primary object(s), which reduces the viewing angle of each camera 107a-n. The zoom is accounted for by the server 101 when determining viewing angle overlap. Additionally, should the cameras include lower video quality, below 4K video feeds, more overlap of the viewing angles is necessary to provide greater details, i.e., more cameras 107 are necessary to provide full coverage of the field of play. Cameras 107a-n may be controlled by server 101 to adjust various camera elements such as zoom and focus. Camera 107 focus may be adjusted to aid in tracking of the primary object(s) and/or limit focus to objects at a determined distance behind the primary object(s), i.e., background. Camera capabilities for each camera may be stored and retrieved from the setup storage 115, and may include capabilities such as zoom, focus, location, and video quality. In some exemplary embodiments, the cameras 107 are all the same, in other exemplary embodiments, Camera1 of the sets of cameras is a wide-angle camera, and Camera2 is a standard view camera. Multiple cameras with different or the same viewing angles can be positioned at the individual mounts to provide redundancy and optional views (e.g., zoomed versus normal).

As shown in further detail in server 101 of FIG. 2, the non-intrusive 360 video server 101 may include many modules to accomplish the capturing and processing of videos to generate immersive media. Although FIG. 2 shows the server 101 as a single device, the server may include any number of processing devices that include various modules from server 101. Each module may include either a software or hardware solution that meets the needs of the system 100. The server 101 may include a camera control module 201, mount control module 203, video capture module 205, object tracking module 207, stitching module 209, selection module 211, and communications module 213. The server 101 may be configured to retrieve and store content with the storage devices 111-115 including the capture video storage 111, processed media storage 113, and system setup storage 115.

The camera control module 201 is used with the communications module 213 to receive camera capabilities from the system setup storage 115. The camera control module 201 may then communicate with the camera(s) 107, via the communication module 213, to adjust the zoom, focus, video quality, etc. based on the primary object, arena size and shape, location of the camera, and tasked focus of the camera (Camera1 or Camera2) of each set of cameras.

For example, a set of cameras may be mounted on the long side of a soccer pitch. The width (i.e., short side) of a soccer pitch is 75 yards so a 25 yard focus differential may be preferred. One of the cameras of the set (Camera1) may focus on the soccer ball on the field of play. The camera may be determined to be 5 yards from the ball, and the camera may be zoomed out a bit to receive a clearer feed of the nearby action. The other camera of the set (Camera2) may include a focus on events behind the ball 25 yards beyond the ball (i.e. 30 yards away from the cameras) based on the focus differential. In another example, the set of cameras may be mounted on the long side of the soccer pitch, the ball may be 70 yards away. Camera1 may be zoomed in to the furthest capability of the camera, and Camera2 may be focused 5-10 yards beyond the ball (i.e., 75-80 yards away). In yet another example, the set of cameras may be mounted on the short side of the soccer pitch. The long side of the soccer pitch is 120 yards long. So, when the ball is 20 yards away from the cameras, Camera1 is zoomed out, and Camera2 is focused 25 yards beyond the ball (i.e., 45 yards away), or may be focused further out to encompass more of the spacing/action on the rest of the pitch.

The mount control module 203 is used with the communications module 213 to receive mount capabilities from the system setup storage 115. The mount control module 203 may then communicate with the mount(s) 105, via the communication module 213, to adjust the directionality of the cameras, rotating the camera feed to center on the primary object, remove/reduce obstructions by raising or lowering the height of the mount, etc. based on the primary object, arena size and shape, location of the mount, which camera (Camera1 or Camera2) the mount is adjusting. The height of the cameras may be set to average head height of competitors to capture video feeds closer to the actual viewpoint of competitors. For example, as a soccer ball (primary object) moves through the pitch, the mount 105 rotates both cameras to follow. The mount 105 may include independent rotation of the cameras based on attachment location on the mount (e.g., for wider placement of the cameras), or both cameras may be rotated at once (i.e., on a single rotating mechanism, for narrow placement of the cameras).

The video capture module 205 is used with the communications module 213 to receive video feeds from cameras 107. The video capture module 205 stores received video feeds in the captured video storage 111 via the communications module 213. The video capture module 205 may store the video for later processing or store the video concurrent to processing. Processing of the video feeds includes using the video capture module 205 with object tracking module 207 and/or stitching module 209. The object tracking module 207 determines/tracks a primary object from the video feed or stored captured video. In one exemplary embodiment, the object tracking module 207 tracks the primary object using the received video feeds, in order to track the primary object in near real-time. Additionally, the video capture module 205 may index all the video feeds to provide directionality, position, viewing angle, and camera information about each video feed. Such information may be stored in the captured video storage 111 to aid in the processing of the capture video in generating immersive media.

The object tracking module 207 may track the primary object using various image processing techniques along with data describing the primary object stored in the system setup storage 115. For example, the primary object may include a soccer ball with traditional markings, including black hexagonal spots on a white ball. The object tracking module 207 may determine whether an object in the video feeds is the soccer ball based on image processing results. The object tracking module 207 may also use image processing with triangulation of the position of two or three cameras (on separate mounts) in the array to track the position of the ball. Thus, the object tracking module 207 may track the location of the ball and provide adjustments/movement controls to the mounts of all the cameras to follow the ball. The object tracking module 207 may be used with the camera control module 201 and mount control module 203. As the primary object is tracked within the received video feeds, the object tracking module determines mount 105 and camera 107 adjustments which may center the primary object in the video feeds. For example, as a soccer ball translates from the right to left of a video feed, the mount 105 is sent adjustment communications to rotate the cameras left in order to keep the ball centered in the feed. Further, the object tracking module 207 may be used to determine an obstruction based on image processing, e.g., an object is found to be in a large portion of the video feed over a predetermined time, the object tracking module 207 may then, via the mount control module 203, adjust the mount 105 by vertically actuating the mount 105 (i.e., raise or lower the cameras 107) to limit or remove the obstruction from the video feed.

The object tracking module 207 may also use a smaller, less intrusive tracking device to follow an object on the field of play. For example, a small sensor device which broadcasts coordinates for the primary object(s), such as on a ball or competitor. The sensor device may include various communication systems, including Wi-Fi, radio frequency (RF), NFC, Bluetooth, etc. The sensor device may also include GPS or another location determination method. Further, the object tracking module 207 may use a combination of sensor and optical processing to track and potentially predict object movement. A prediction may be made to provide better camera tracking. Further, the tracking device may include reflective markers on the primary object(s) that are tracked optically.

The stitching module 209 processes the captured video to combine multiple video feeds into a single immersive media composition. The stitching module 209 may make horizon determinations, generate a composite graph, and balance exposure to stitch together videos from the multiple video feeds. The horizon determination aids in centering a scene for default viewing by a consumer. The horizon determinations include image processing to determine the horizon and/or may include information about a levelling mechanism and whether the camera is level to the horizon. The composite graphing aligns the images in the video to cut and blend overlapping views by image processing to determine objects near the edge of each camera feed. The objects are determined to be the same from multiple camera feeds, and may thus include images that can be overlapped. The number of cameras, location of cameras, etc. may affect the stitching of the camera feeds. The exposure balancing fixes color, brightness, and contrast variations between camera feeds to have a more uniform look. The stitching module 209 may also be used to select various immersive media compositions, e.g., 360-degree VR or AR, or a 2-D 180-degree view media with multiple (at least two) viewpoints. To make a horizon determination, the stitching module 209 may use the object tracking module 207 to process the video image to determine a horizon. The stitching module 209 may then store the immersive media in the processed media storage 113.

In particular, the composite graphing may include an image processing to determine an object in one camera feed is shown from one direction (based on the camera location), and based on image processing of another camera feed, the same object is shown from a different direction. Each camera feed may be combined based on known location in the array and may be related to the indexing of the camera feeds. For example, using the mount locations described in FIG. 3 below, camera feed from Camera1 of mount 105*a* shows a soccer ball, this feed is stitched together with the next Camera1 feed of mount 105*b*, and does not jump to camera feeds from mount 105*c*. In this manner, the stitching occurs in an ordered manner to compile a more complete 3D view of objects in the field of play.

The selection module 211 receives a viewpoint selection from a user of the system 100. The selection may be of a team of the competition, which provides the viewpoint from the nearest competitor to the primary object(s). For example, the competitor holding/dribbling the soccer ball, and/or the nearest competitor to the ball on the team selected. The system 100, may then, based on the selection of immersive media format (i.e., 3D VR, 2D VR, etc.) may initially show a view from the primary object, e.g., ball, in the general direction of most of the opposing team, in the direction of the opposing team's goal, and/or in the direction the nearest competitor is facing. When the immersive media format is a 2D VR format, the view may only be of the opposing team's goal. In one exemplary embodiment, the system 100 generates a 3D VR immersive media which, when a 2D VR (180-degree viewpoint), is split to generate the 2D VR immersive media. In other embodiments, the system 100 directly generates the selected immersive media.

In other embodiments, a selection is of a competitor on the field instead of a team. When the selection is of a competitor, some or all the cameras may be directed at the selected competitor instead of a ball. The selection module 211 may use the mount control module 201, to task some or all the cameras to follow/track a different primary object than the ball (e.g., the selected competitor or a location on the field) to show points of view from these other selections.

As shown in FIG. 3, a top-down view of an array of sets of mounted cameras is shown surrounding an arena. The mounts 105*a-p* surround the soccer pitch. FIG. 2 details the directionality and viewing angle of a few of the cameras on mounts 105*a, b, c, l, n*, and *o*, however in one exemplary embodiment, all the cameras on all the mounts 105*a-p* may also be directed toward the soccer ball. In other exemplary embodiments, the 360 degrees of coverage is met, and some of the remaining cameras of mounts 105*d-k, m*, and *p* may be directed toward other primary objects, e.g., players. Similarly, FIG. 4 shows a perspective view of another array of sets of mounted cameras 105*a-l* to show the height dimensionality of the mounts.

Figure 5:
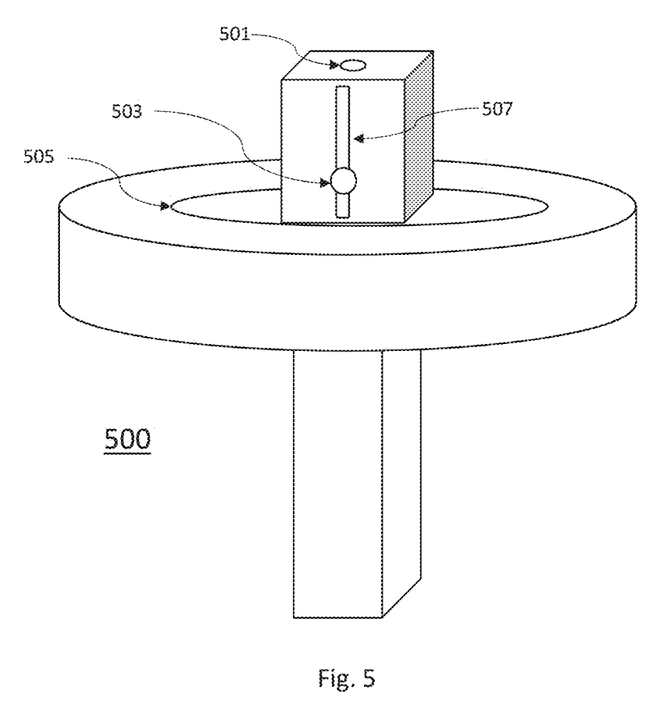
FIG. 5 shows a diagram of a mount for two cameras which may be positioned surrounding a field of competition.

As shown in further detail FIG. 5 describes one exemplary embodiment of a mount 500 which may be used to attach at least two cameras. A first camera attaching at point 501, and a second camera attaching at point 503. The cameras attaching through commonly used attachment methods including a screw or clamp. A vertically actuating mechanism raising and lowering the second camera from the attachment point 503 along the track 507. A rotating mechanism 505 rotating both cameras along the axis of the mount body.

FIG. 6 shows a flow chart for the method of use of the non-intrusive 360 view system in accordance with the invention. In step 601, the server 101 receives video feeds from the array of cameras 107. In step 603, the video feeds are analyzed to determine a primary object for tracking. In step 605, the server 101 controls actuating mechanisms of the mounts 105 in the array of mounts to follow the primary object. The cameras being mounted to the mounts. Based on this tracking, in step 607, the video feeds are stitched to generate immersive media. In step 609, the server 101 receives a viewpoint selection of the immersive media. In step 611, the server 101 presents the immersive media from the viewpoint during playback.

The systems and methods of the invention provide a non-intrusive 360 view. The invention processes video feeds from an array of cameras to track an object in the video feeds and generates an immersive media from the video feeds. The system identifies a primary object and tracks the primary object with an array of mounted sets of at least two cameras. Each of the sets including a camera directed at the object and another camera directed at a background of the object. The system then stitches the video feeds to generate the immersive media.

I claim:
1. A system for capturing video from an array of cameras to generate an immersive media video feed for playback, the system comprising:

an array of mounts surrounding a field of an event, each of the mounts comprising an actuating mechanism, wherein the array of cameras is attached to the mounts in sets of at least two cameras to each mount, each of the sets of the at least two cameras comprising:
  a first camera focused on a primary object of the event, and
  a second camera focused on a background of the primary object at a determined distance beyond the primary object based on a focus differential from a focus of the first camera, wherein the focus differential is the determined distance maintained between the focused primary object and the focused background of the primary object; and
  a computing server to actuate the mounts to follow the primary object through the field of the event, and to receive and process the video from the array of cameras to generate the immersive media video feed using a known location of each of the cameras and image stitching, to receive a viewpoint selection input from a user of the system, and to present the immersive media feed from the received selected viewpoint.

2. A system of claim 1, wherein the computing server receives the viewpoint selection input of the immersive media video feed from the user of the system and presents the immersive media video feed from the selected viewpoint for playback for the user to control a surrounding view direction to see what is viewable from the selected viewpoint based on images from the received video.

3. A system of claim 1, wherein the actuating mechanism rotates one of the at least two cameras to follow the primary object.

4. A system of claim 1, wherein the computing server tracks and identifies a location of the primary object in the field to determine the focus of the second camera on the background of the primary object at the determined distance beyond the primary object based on the known location of the second camera.

5. A system of claim 4, wherein the focus of the second camera on the background of the primary object is at the determined distance maintained beyond the location of the primary object with respect to the second camera.

6. A system of claim 1, wherein the computing server indexes the video from each camera of the array of cameras based on at least one of a directionality, the known location of each of the cameras, a viewing angle, and camera information of each of the cameras.

7. A system of claim 1, wherein the immersive media video feed is a 360-degree virtual reality media video feed.

8. A computer system for capturing video from an array of cameras to generate an immersive media video feed for playback, the computer system comprising:
  a processor to control an actuating mechanism of each mount of an array of mounts surrounding a field of an event to follow a primary object through the field of the event by analyzing video from the array of cameras with an image processing technique to identify the primary object, and to receive and process the video from the array of cameras attached to the mounts to generate the immersive media video feed based on a known location of each of the cameras, the image processing technique, and a viewpoint selection input from a user of the system,
  wherein the array of cameras is attached to the mounts in sets of at least two cameras to each mount, each of the sets of the at least two cameras comprising:
    a first camera of the at least two cameras focused on a primary object of the event, and
    a second camera of the at least two cameras focused on a background of the primary object at a determined distance beyond the primary object based on a focus differential from a focus of the first camera, wherein the focus differential is the determined distance maintained between the focused primary object and the focused background of the primary object, and wherein the determined distance maintained is based on at least one selected from the group of size of the field of the event, distance of the known location of each of the cameras, and number of sets of at least two camera.

9. A computer system of claim 8, wherein the processor receives the viewpoint selection input of the immersive media video feed from the user of the system and presents the immersive media video feed from the selected viewpoint for playback for the user to control a surrounding view direction to see what is viewable from the selected viewpoint based on images from the processed video.

10. A computer system of claim 8, wherein the processor tracks and identifies a location of the primary object in the field to follow the primary object, to determine the control of the actuating mechanism, and to determine a focus of the second camera on the background of the primary object at a determined distance beyond the primary object.

11. A computer system of claim 10, wherein the focus of the second camera on the background of the primary object is at the determined distance beyond the location of the primary object with respect to the second camera.

12. A computer system of claim 8, wherein the processor indexes the video from each camera of the array of cameras based on at least one of a directionality, the known location of each of the cameras, a viewing angle, and camera information of each of the cameras.

13. A computer system of claim 8, wherein the immersive media video feed is a 360-degree virtual reality media video feed.

14. A computer-implemented method for capturing video from an array of cameras to generate an immersive media video feed for playback, the method comprising:
  receiving, by a processor, video feeds from the array of cameras surrounding a field of an event;
  analyzing, by the processor, the video feeds to identify a primary object in the video feeds;
  directing, by the processor, an actuating mechanism of each mount of an array of mounts to follow the primary object, wherein the array of cameras are attached to the array of mounts in sets of at least two cameras of the array of cameras to each mount of the array of mounts, each of the sets comprises a first camera of the at least two cameras focused on the primary object of the event and a second camera of the at least two cameras focused on a background of the primary object at a determined distance beyond the primary object based on a focus differential from a focus of the first camera, wherein the focus differential is the determined distance maintained between the focused primary object and the focused background of the primary object; and
  generating, by the processor, the immersive media video feed from the video feeds by stitching the video feeds together based on a known location of each of the cameras, an image processing technique, and a viewpoint selection input from a user of the system.

15. A computer-implemented method of claim 14, further comprising:
  receiving the viewpoint selection input of the immersive media video feed from the user of the system; and
  presenting the immersive media video feed from the selected viewpoint during playback for the user to control a surrounding view direction to see what is viewable from the selected viewpoint based on images from the stitched video feeds.

16. A computer-implemented method of claim 14, further comprising: tracking and identifying a location of the primary object in the field to determine the focus of the second camera on the background of the primary object at the determined distance beyond the primary object based on the known location of the second camera.

17. A computer-implemented method of claim 16, wherein the focus of the second camera on the background of the primary object is at a determined distance maintained beyond the location of the primary object with respect to the second camera.

18. A computer-implemented method of claim 14, further comprising: indexing the video feeds from each camera of the array of cameras into the immersive media video feed based on at least one of a directionality, the known location of each of the cameras, a viewing angle, and camera information of each of the cameras.

19. A computer-implemented method of claim 14, wherein the immersive media video feed is a 360-degree virtual reality media video feed.

\* \* \* \* \*